June 10, 1952   V. E. BESSE   2,599,887
REAMING TOOL
Filed Nov. 29, 1948
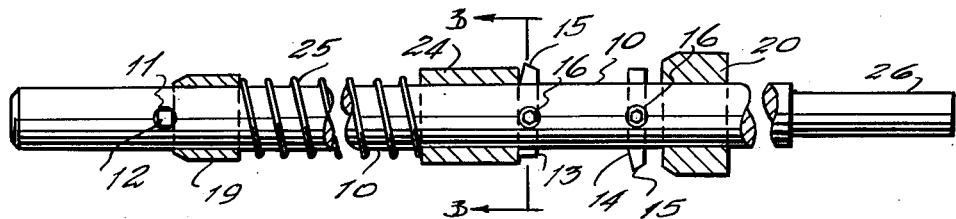
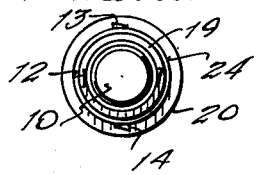 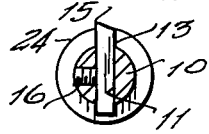 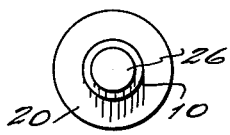
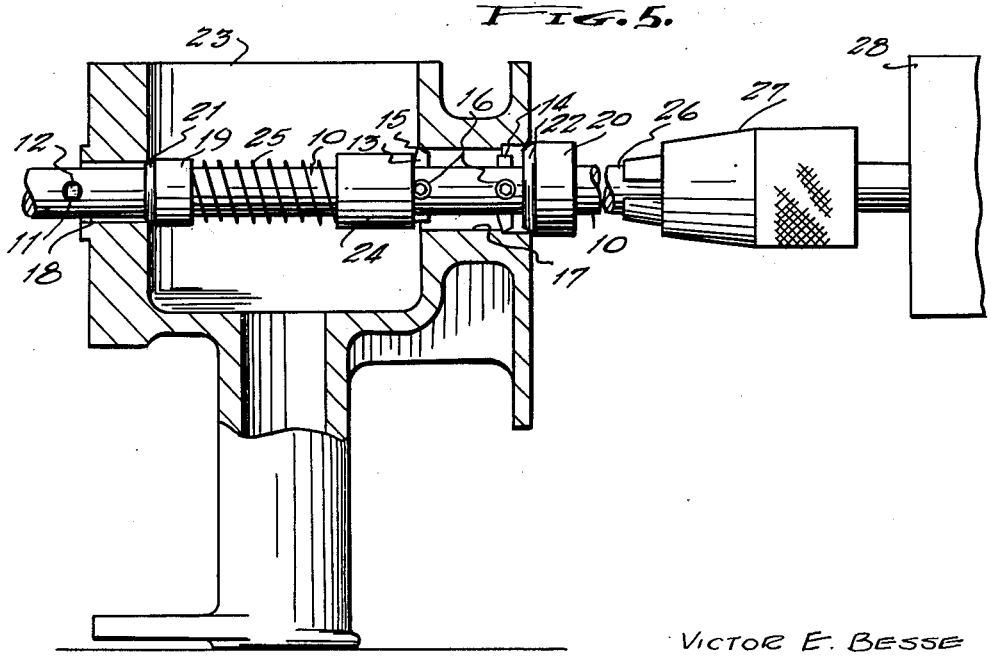
VICTOR E. BESSE
INVENTOR.
BY Cecil L. Wood
ATTORNEY Patented June 10, 1952

2,599,887

UNITED STATES PATENT OFFICE 2,599,887

REAMING TOOL

Victor E. Besse, Fort Worth, Tex.

Application November 29, 1948, Serial No. 62,460

1 Claim. (Cl. 77—58)

This invention relates to cutting or reaming tools of the type employed in lathe operations, and it has particular reference to a tool for reaming or enlarging bores, such as shaft journals, and the like, and its principal object resides in the provision of a simple and inexpensive tool capable of being employed with a conventional lathe for reaming out or enlarging aligned bores in castings or housings for the purpose of renewing or replacing worn bearings for shafts, and to provide guide means for the tool in the bores to insure proper alignment and uniform cutting for minimizing the time and expense required for such operations.

A further object of the invention is that of providing an economical instrument which is capable of being secured in a lathe chuck and operated to uniformly ream one or more aligned bores in a minimum period of time and requiring a minimum of skill in such operations.

Broadly, the invention contemplates the provision of a reaming tool by which castings, such as gear housings having aligned bore holes therein for a single shaft extending therethrough, can be enlarged for the insertion of bushings, non-friction bearings, and the like, or larger shafts may be installed when the journals become worn and distorted.

While the foregoing objects are paramount, other and lesser objects will become manifest as the description proceeds, taken in connection with the appended drawings wherein:

Figure 1 is a side elevational view of the tool shaft on which are shown, in cross-section, a plurality of guide members for properly aligning the tool in the bore holes.

Figure 2 is an end view of the invention.

Figure 3 is a transverse cross-sectional view of the invention, taken on lines 3—3 of Figure 1, illustrating the manner in which the cutting members are adjustably secured in the tool.

Figure 4 is an opposite end view of the invention, showing the end of the shank by which the tool is secured in a lathe chuck, and Figure 5 is an elevational view of the invention in operation within a casting, the latter being shown in vertical section, having a pair of aligned bores, the shank of the tool being shown installed in a lathe chuck.

The invention is specifically designed for reaming shaft bores in gear-box castings for washing machines, and the like, wherein the drive shaft and gear assembly for the wringer often becomes worn to the point where the bores are distorted and the shaft wobbles in its journals and new bushings are required. In such operations it is desirable to ream out or rebore the journals and enlarge the same sufficiently to permit the insertion therein of bronze bushings which obviously serve to prolong the life of the bores in which the shaft operates. It is, of course, important that both bores in the casting should be in proper alignment and when one of the journals has a smaller diameter than the other the reaming tool should be designed accordingly. It is essential, in any event, that the shaft journals be maintained in true alignment to insure the proper function of the shaft installed therein.

Accordingly, therefore, the invention comprises a shaft or body 10 of any required length having a series of apertures 11 arranged therethrough and properly spaced to receive cutting tools 12, 13 and 14 in the manner illustrated in Figures 1 and 5. The members 12, 13 and 14 are preferably arranged with their cutting points 15 extending radially from the shaft 10 at right angles thereto and adjustably secured therein by set screws 16 so that the cutting elements can be adjusted to cut any depth required, as illustrated in Figure 5.

In utilizing the device for operations, such as that illustrated in Figure 5, where a pair of aligned bores 17 and 18 are employed, a pair of guide members 19 and 20 are slidably arranged on the shaft 10 and have their operative surfaces 21 and 22 bevelled to permit their being seated in the bores 17 and 18, respectively, and properly guide the shaft 10 therethrough. In the casting 23, illustrated in Figure 5, the bore 17 is somewhat larger in diameter than the bore 18 and therefore the guide member 20 is larger than the guide member 19. This arrangement permits the guide 19 to be passed through the bore 17 at the beginning of the operations and engage the bore 18, in the manner illustrated in Figure 5, while the guide 20 engages the bore 17 to properly align the tool while the cutter members 12, 13 and 14 perform their cutting operations.

In initially installing the tool in the casting 23, the shaft 10 is extended through the bore 17 and then into and through the bore 18, the guide 19 engaging the mouth of the bore 18 by its seat 21, while a stationary guide member 24, intermediate the members 19 and 20, properly guides the tool through the larger bore 17 and until the cutting member 13 has progressed therethrough to the point illustrated in Figure 5, and the cutting member 12 has traversed the bore 18. The guide 20 will then engage the then enlarged bore 17 to retain the shaft 10 in proper alignment until the second cutting member 14 has traversed the bore 17 to enlarge the same to the extent of the cut performed by the member 14.

It will be noted that each of the cutting members 13 and 14 performs only a portion of the cutting operations within the bore 17, the member 13 performing a certain cut in advance of the member 14 which makes another cut to enlarge the bore to the desired diameter, the adjustability of the cutting members 13 and 14, as well as that of the member 12, making it possible to increase or decrease the depth of the cut and to perform cutting operations on greater or lesser diameter bores, as required. The guide members 19, 20 and 24, arranged on the shaft 10, simplify the operation to the extent that little attention to the operation is required while it is being performed. A spring 25 is arranged upon the shaft 10 between the guide member 19 and the member 24 to urge the guide member 19 against the mouth of the bore 18 while the cutting operation is completed in the bore 17 and thus insure the proper alignment of the two bores when the cutting operations are completed.

The body or shaft 10 of the invention is formed with a shank 26 which is adapted to be fitted into a chuck 27 of a lathe 28, or other power driven device, such as an electric drill. The guide 24 may be freely slidable on the body 10 and limited in its movement under tension of the spring 25 by the tool 13, in the manner illustrated in Figures 1 and 5. The spring 25 is compressed as the tool is moved through the bore 17 and the guide 24 approaches the bore 18.

Manifestly, the structure herein shown and described is capable of considerable modification from time to time by persons skilled in the art without departing from the spirit and intent of the invention or the scope of the appended claim.

What is claimed is:

In a reaming tool for castings having aligned bores on opposite sides of a cavity, the said tool having a shaft formed with a stem on one end adapted to be engaged by the chuck of a lathe, in combination, a cutter tool adjustably arranged in said shaft near the end thereof opposite said stem and adapted to operate in the bore farthest from said stem, a guide member slidably arranged on said shaft adjacent to said cutter tool, a pair of spaced cutter tools adjustably secured through said shaft spaced from said first named cutter tool and adapted to operate in the opposite bore, another guide member arranged on said shaft between said first named guide and one of said last named cutter tools engageable with said opposite bore, a spring on said shaft tensioning said guide members against said tools adjacent thereto, and a guide member for centering said shaft in said opposite bore.

VICTOR E. BESSE.

REFERENCES CITED

The following references are of record in the file of this patent:

UNITED STATES PATENTS

| Number | Name | Date |
|---|---|---|
| 1,590,209 | Sanborn | Jan. 29, 1926 |
| 1,817,730 | Beckman | Aug. 4, 1931 |
| 2,091,628 | Carlson | Aug. 31, 1937 |

FOREIGN PATENTS

| Number | Country | Date |
|---|---|---|
| 124,389 | Great Britain | Mar. 27, 1919 |